United States Patent [19]
Becker

[11] Patent Number: 5,383,028
[45] Date of Patent: Jan. 17, 1995

[54] METHOD AND APPARATUS FOR RECORDING RASTERED IMAGES

[75] Inventor: Fahim Becker, Kiel, Germany

[73] Assignee: Linotype-Hell AG, Eschborn, Germany

[21] Appl. No.: 108,702

[22] PCT Filed: Mar. 3, 1992

[86] PCT No.: PCT/DE92/00172
§ 371 Date: Sep. 2, 1993
§ 102(e) Date: Sep. 2, 1993

[87] PCT Pub. No.: WO92/16070
PCT Pub. Date: Sep. 17, 1992

[30] Foreign Application Priority Data

Mar. 9, 1991 [DE] Germany .............. 4107703

[51] Int. Cl.⁶ .............................. H04N 1/40
[52] U.S. Cl. .................. 358/401; 358/458; 358/521; 358/535
[58] Field of Search .......... 358/429, 447, 448, 454, 358/455, 461, 463, 465, 466, 458, 456, 296, 298, 521, 530, 534, 535, 536; 382/50, 51

[56] References Cited
U.S. PATENT DOCUMENTS 3,904,816  9/1975  Taudt et al. ............. 358/521
4,499,489  2/1985  Gall et al. ............... 358/536

FOREIGN PATENT DOCUMENTS 59-52969A  3/1984  Japan ................... 358/536

Primary Examiner—Edward L. Coles, Sr.
Assistant Examiner—Jerome Grant, II
Attorney, Agent, or Firm—Hill, Steadman & Simpson

[57] ABSTRACT

A method for the point-by-point and line-by-line recording of rastered images, whereby, in order to avoid discontinuous changes of the raster density, a modulation signal that increases the raster density to be recorded and a modulation signal that reduces the raster density are superimposed, at least in one direction of an image coordinate, on the image signal which determines the raster density to be recorded. As a result, at least one reduced and one enlarged raster point is recorded in respective alternating fashion in at least one expanse of the raster between the raster points that reproduce the raster density to be recorded. An apparatus for implementation of the method comprises a modulator which combines an image signal with a modulation signal. The modulator is connected to a modulation generator that generates the modulation signal and in which the amplitude of the modulation signal is influenced, dependent on the amplitude of the image signal.

9 Claims, 4 Drawing Sheets

METHOD AND APPARATUS FOR RECORDING RASTERED IMAGES

BACKGROUND OF THE INVENTION

The invention is directed to a method for the point-by-point and line-by-line recording of rastered images, whereby a modulation signal is superimposed on the image signal that defines the raster density to be recorded in order to avoid discontinuous changes of the raster density.

The invention is also directed to an apparatus for recording rastered images comprising a modulator for combining an image signal and a modulation signal.

In reproduction technology, rastered images are occasionally recorded having a gradual change of the raster density or raster point size, and are referred to as density progressions or uniform density areas having a constant raster density or raster point size. It is thereby required that the density progressions and uniform density surfaces are recorded insofar as possible without disturbing, discontinuous density transitions or density discontinuities, which are also referred to as breaks. Such disturbing breaks, however, cannot always be avoided due to the rastered recording.

German Patent 17 72 367 already discloses a method for recording rastered images wherein a modulation signal is superimposed on the image signal that determines the raster density or, respectively, raster point size in order to avoid disturbing breaks, neighboring raster densities being mixed with the assistance thereof in an overlap region. The mixing of the raster densities within the mixed region occurs according to a statistical distribution.

It has particularly proven disadvantageous in the known method that image islands in which a density skip is not compensated due to a low amplitude of the modulation signal arise due to the statistical mixing corresponding to statistical probability. Beyond this, it is also possible that, given an unfavorable statistical superimposition of an image signal allocated to a uniform raster density with a modulation signal, line-shaped transitions are generated that would not occur without the modulation. It must in fact be presumed that such accidental, visible transition regions are respectively limited to small regions of the image. Particularly in a high-quality reproduction, however, small, discontinuity-like transitions are also perceptible that deteriorate the reproduction quality. Due to the statistical distribution of the modulation signal, beyond this, no reliable prediction can be made about the size and the appearance of such transition regions, since the appearance of specific formations can only be predicted with probability values.

SUMMARY OF THE INVENTION

It is therefore an object of the present invention to improve a method of the type initially cited such that discontinuous density changes are reliably avoided.

This object is inventively achieved in that a modulation signal that increases the raster density to be recorded and a modulation signal that reduces the raster density is superimposed in alternating fashion on the image signal at least in the direction of one image coordinate, as a result whereof at least one reduced and one enlarged raster point is respectively recorded in at least one expanse of the raster between the pixels that reproduce the raster density to be recorded.

A further object of the present invention is to improve an apparatus of the type initially cited such that the intensity of the modulation can be matched to the respectively required raster density.

This object is inventively achieved in that the modulator is connected to a modulation generator that generates the modulation signal and that comprises a control input that allows an influencing of the amplitude of the modulation signal dependent on the amplitude of the image signal.

The assistance of the method of the invention makes it possible to avoid the appearance of discontinuous density changes due to a defined modification of the image signal. It is assured that neighboring raster points have different sizes, particularly given an alternating modulation of the image signal in the direction of both image coordinates. Raster points of identical density that tend to form breaks are thus reliably prevented from lying next to one another in the direction of an image coordinate.

The assistance of the apparatus of the invention makes it possible to adapt the intensity of the modulation to the respectively existing demands. This matching is required because the occurrence of discontinuous density changes given a comparatively high amplitude of the image signal cannot be guaranteed given a modulation with an excessively low modulation amplitude. Given excessively high amplitudes of the modulation signal, by contrast, a great modification of the original raster density occurs that would lead to visible modifications in the informational content of the image.

Further details of the invention derive from the following, detailed description and from the attached drawings wherein preferred embodiments of the invention are shown by way of example.

DESCRIPTION OF THE PREFERRED EMBODIMENTS

Figure 1:
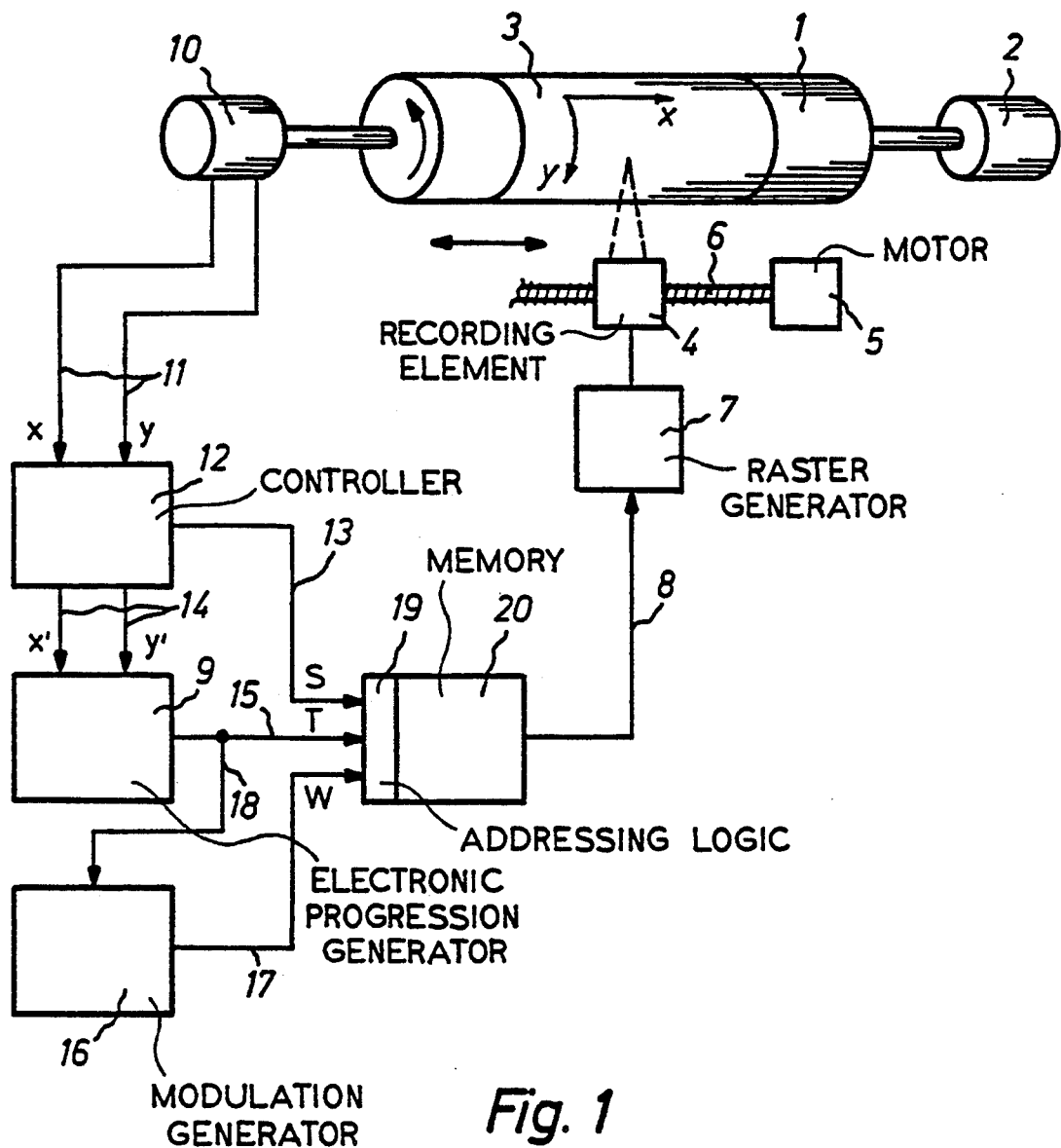
FIG. 1 is a block circuit diagram of an apparatus for recording rastered images which comprises a progression generator for generating prescribable density progressions.

FIG. 1 shows the block circuit diagram of an apparatus for recording rastered images. A recording medium 3, for example a film, is clamped on a recording drum 1 that is rotationally driven by a motor 2. A recording element 4 that, for example, is designed as a controllable laser generator for generating a recording beam is moved axially along the recording drum 1 by a motor 5 on the basis of a spindle 6. The recording beam undertakes the point-by-point and line-by-line exposure of the rastered image on the recording medium 3. Dependent on an image signal on a line 8, a raster generator 7 generates a control signal for the recording element 4 which switches the recording beam on and off for generating the raster points.

The image signal, referred to below as a carrier signal, defines the raster density or raster point size to be recorded, and thus defines the tonal value to be recorded. The raster generator 7 is advantageously constructed according to German Patent 28 27 596. The recording element 4 can also be designed as a multitrack recording element.

For recording density progressions on the recording medium 3, a corresponding carrier signal T is generated. The carrier signal T can be acquired by opto-electronic scanning of an optical wedge or can be "artificially" acquired with an electronic progression generator 9, as in the illustrated exemplary embodiment.

The progression generator 9, for example, is designed as a digital memory in which the digital carrier signal values T that define the density progression to be recorded are stored dependent on the image coordinates x and y of a XY-coordinate system that is allocated to the recording medium 3 and is aligned in a circumferential direction of the recording drum 1 and perpendicularly thereto.

A coordinate generator 10 that is mechanically coupled to the recording drum 1 is provided for the ongoing identification of the image coordinates x and y of the location on the recording medium 3 that is momentarily impinged by the recording beam. Whereas the image coordinate y continuously changes during a drum revolution, the image coordinate x changes only once per drum revolution and thus respectively signals a new line beginning.

The image coordinates x and y generated by the coordinate generator 10 proceed via lines 11 to a controller 12. A control signal S on a line 13 and addresses x' and y' on lines 14 are formed from the image coordinates x and y in the controller 12. The addresses x' and y' address the progression generator 9 from which the location-dependent, digital carrier signal values $T = f(x, y)$ required for the recording of a density progression are read out point-by-point and line-by-line via a line 15.

A modulation generator or sweep generator 16 generates digital modulation signal values W that represent auxiliary densities on a line 17. Advantageously, the modulation generator 16 is controlled by the digital carrier signal values T via a line 18 in such a way that the modulation signal values W that are generated are automatically matched to the respective carrier signal values T. It has proven especially expedient to undertake the signal matching such that the modulation signal values W respectively amount to approximately 0.7% of the carrier signal values T that are called in. Given a digital carrier signal T having a resolution of 0 through 1023 (ten-bit resolution), a value range from 0 through 7, for instance, is thus expedient for the digital modulation signal W.

In order to avoid discontinuous density changes in the recording of rastered progressions, further signal values P and M are formed in addition to the carrier signal values T that define the raster density to be actually recorded, being formed by additive and subtractive operation of carrier signal values T and modulation signal values M according to the equations $P = (T + W)$, $M = (T - W)$ and these further signal values T and M representing raster densities that are increased or lowered in comparison to the raster density to be recorded. The carrier signal values T and the additionally generated signal values P and M are forwarded as recording signals—in a sequence defined by the control signal S—to the raster generator 7 and are converted in the latter into corresponding raster point sizes, as a result whereof at least one reduced and one enlarged raster point is recorded in alternating fashion between the raster points that reproduce the raster density to be recorded (FIG. 3).

For signal operation, the carrier signal values T on the line 15, the modulation signal values W on the line 17, and the control signal values S on the line 13 are supplied to an addressing logic 19 and are combined therein to form addresses for a memory 20. The carrier signal value T itself and all possible value combinations $P = (T + W)$ and $M(T - W)$ are stored in callable fashion in the memory 20 for every occurring carrier signal value T. The corresponding signal values T, P or M are then read out from the memory 20 by the addresses formed in the addressing logic 19 and are forwarded to the raster generator 7 via the line 8.

The apparatus for recording rastered images shown in FIG. 1 is a drum recorder or the recording side of a drum scanner. However, it lies within the scope of the invention to also design the apparatus as, for example, a flat bed recorder or an inside-drum recorder.

Figures 2, 3:
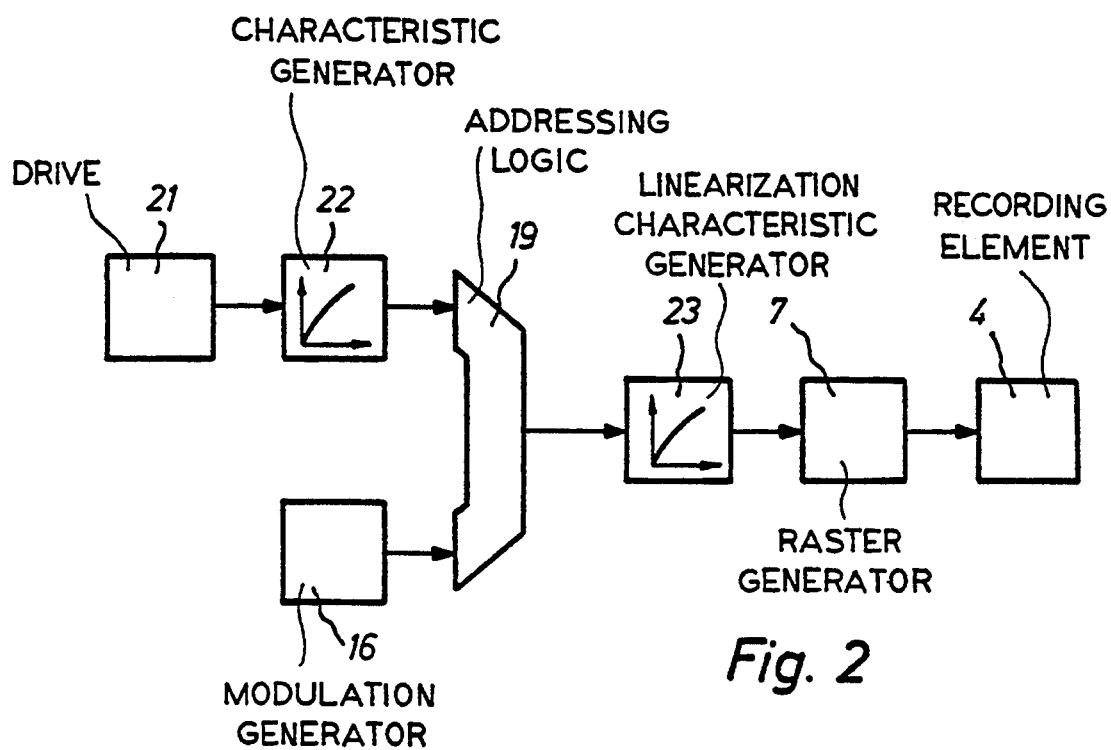
FIG. 2 is a block circuit diagram for implementing the execution of the method.
FIG. 3 is a sketch for illustrating the modulation of the image signal by which the raster density is increased or, respectively, lowered in alternating fashion.

Only the critical functions are introduced into the illustrated blocks in the block circuit diagram shown in FIG. 2 for illustrating the sequence of the method. A characteristic generator 22 for generating the carrier signal T is driven by a drive 21, for example the CPU of a digital circuit. The carrier signal T is supplied to the addressing logic 19 in common with the modulation signal W generated by the modulation generator 16. The drive of a linearization characteristic generator 23 occurs via the addressing logic 19. The recording signal generated with the assistance of the linearization characteristic generator 23 is supplied to the raster generator 7. The control signals acquired in the raster generator 7, finally, proceed to the recording element 4.

FIG. 3 shows an example of a pixel-wise density distribution within an image region composed of lines each having respectively four pixels.

The pixels referenced T have the density values (image density values) defined by the respective carrier signal values T; the pixels referenced P have the density values increased in comparison to the image density values; and the pixels referenced M have density values reduced in comparison to the image density values, whereby the increased and reduced density values are generated by the afore-mentioned modulation of the carrier signal values T, and the sequence of the density values in the lines and the offset of the density values from line to line is controlled by the control signal S.

This density pattern is then converted into corresponding raster point sizes in the raster generator 7, so that respectively at least one reduced and one enlarged raster point is recorded in alternating fashion on the recording medium 3 between the raster point sizes defined by the image densities, as a result whereof disturbing density changes are advantageously avoided.

Figure 4A:
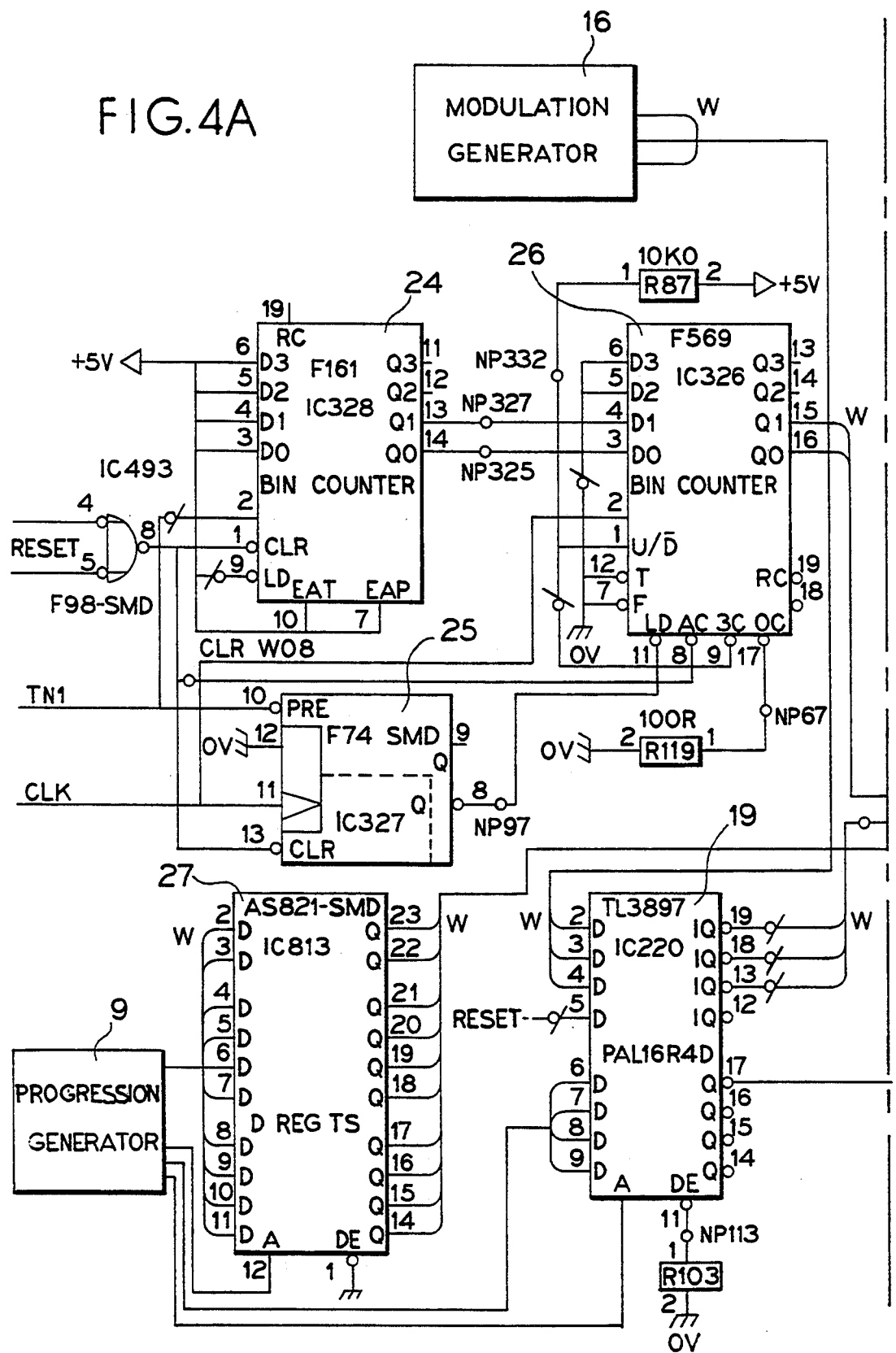
FIGS. 4A, 4B is an electrical circuit diagram of the critical components of the apparatus.
Figure 4B:
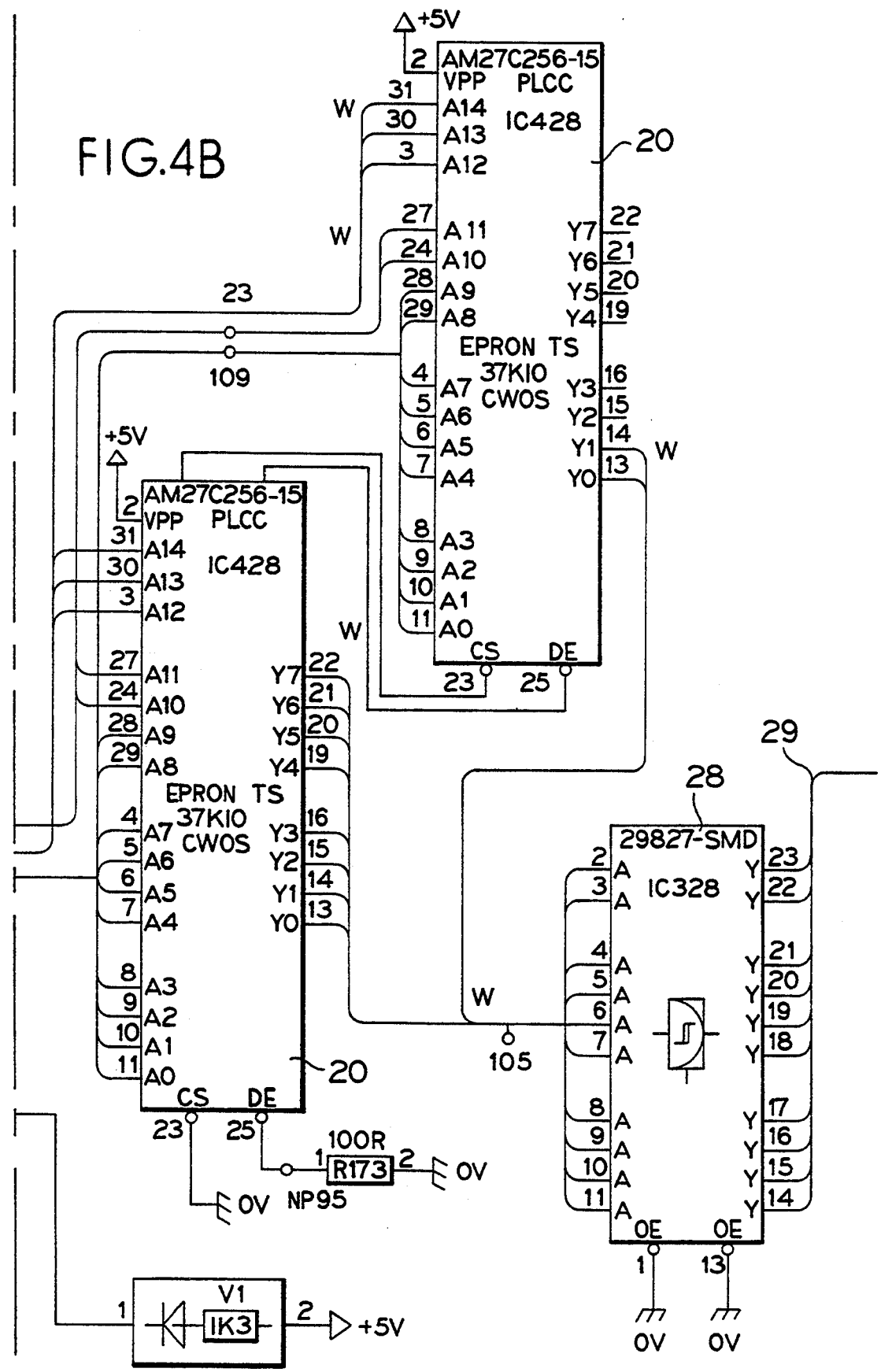

FIGS. 4A, 4B shows an example of the realization of the critical electronic components with the assistance of integrated circuits. The control signal for the alternating addition and subtraction of the modulation signal values W is generated with a flip-flop 25 that is interconnected with two binary counters 24; 26. A module of the type F74-SMD can be employed as flip-flop 25; a digital module F 161 can be employed as first binary counter (24); and a digital module F 569 can be employed as second binary counter 26. Carrier signal values T generated by the progression generator 9 are first intermediately stored in an intermediate memory 27 which is driven in clocked fashion. The intermediate memory 27 can be realized as AS 821-SMD. The drive of the memory 20, which is constructed of two modules of the type 27 C 256, occurs via the addressing logic 19 realized as PAL 16 R 4. The values read out from the memory 20 are supplied to a driver 28 whose output 29 is connected via the line 8 to the raster generator 7.

Although various minor changes and modifications might be proposed by those skilled in the art, it will be understood that I wish to include within the scope of the patent warranted hereon all such changes and modifications as reasonably come within my contribution to the art.

I claim:

1. A method for point-by-point and line-by-line recording of rastered images wherein image signal values define raster densities or raster point sizes to be respectively recorded, comprising the steps of:
   providing a first modulation value for raising a raster density to be recorded and providing a second modulation value for lowering a raster density to be recorded;
   superimposing the first and second modulation values on the image signal values in alternating fashion at least in a direction of an image coordinate on at least one image signal value that lies between image signal values that define unmodified raster densities to be recorded; and
   as a result thereof recording in alternating fashion at least one reduced or one enlarged raster point in at least one expanse of the raster between the raster points that reproduce the raster densities to be recorded, the superimposing of the first and second modulation values on the image signal values resulting in avoidance of discontinuous changes of the raster densities being recorded.

2. A method according to claim 1 wherein an amplitude of the modulation values is set dependent on an amplitude of the image signal values.

3. A method according to claim 2 wherein the amplitude of the modulation values is approximately 0.7% of the amplitude of the image signal values.

4. A method according to claim 1 including the step of generating the image signal values according to a density progression to be recorded.

5. A method according to claim 1 including the step of generating the image signal values by opto-electronic scanning of an original that contains a density progression to be recorded.

6. A method according to claim 1 wherein, given modulation of the image signal values in a direction of both image coordinates, respectively arranging offset relative to one another in neighboring lines raster points that reproduce the raster densities to be recorded.

7. A method for point-by-point and line-by-line recording of rastered images wherein image signal values define raster densities or raster point sizes to be respectively recorded, comprising the steps of:
   providing a first modulation value for raising a raster density to be recorded and a second modulation value for lowering a raster density to be recorded;
   superimposing the first modulation value on an image signal value, thereafter at least one of a following image signal value is left unmodified, and thereafter superimposing the second modulation value on at least one of a following image signal value; and
   using the unmodified and modulated signal values to record the rastered image such that an enlarged raster density raster point is recorded followed by at least one unmodified raster point followed by a lowered density raster point so that discontinuous changes of raster densities are avoided.

8. An apparatus for point-by-point and line-by-line recording of rastered images, comprising:
   a modulator for superimposition of image signal values that define raster densities to be recorded and modulation values for increasing and decreasing the raster densities to be recorded;
   a raster generator connected to the modulator;
   a recording element connected to the raster generator for point-by-point and line-by-line recording of the rastered images;
   a modulation generator having an output connected to the modulator and an input to which are fed image signal values for matching modulation signal amplitude values to the image signal values and for outputting the modulation values;
   a controller connected to the modulator for image coordinate-wise control of the superimposition of the image signal values and the modulation values; and
   said modulator comprising a memory containing values that can be read out and an addressing logic for operating the image signal values with the modulation values.

9. An apparatus for point-by-point and line-by-line recording of rastered images, comprising:
   a modulator for superimposition of image signal values that define raster densities to be recorded and modulation values for increasing and decreasing the raster densities to be recorded;
   a raster generator connected to the modulator;
   a recording element connected to the raster generator for point-by-point and line-by-line recording of the rastered images;
   a modulation generator having an output connected to the modulator and an input to which are fed image signal values for matching modulation signal amplitude values to the image signal values and for outputting the modulation values;
   a controller connected to the modulator for image-coordinate-wise control of the superimposition of the image signal values and the modulation values; and
   said controller being connected to a progression generator for generating the image signal values according to a prescribable density progression to be recorded.

* * * * *